US006337853B1

(12) United States Patent
Piolini

(10) Patent No.: US 6,337,853 B1
(45) Date of Patent: Jan. 8, 2002

(54) METHOD FOR CHANNEL ASSIGNMENT IN A MOBILE COMMUNICATION SYSTEM WITH SPACE DIVISION MULTIPLE ACCESS

(75) Inventor: Flavio Piolini, Milan (IT)

(73) Assignee: CSELT-Cento Studi E Laborati Telecomunicazioni S.p.A., Turin (IT)

( * ) Notice: Subject to any disclaimer, the term of this patent is extended or adjusted under 35 U.S.C. 154(b) by 0 days.

(21) Appl. No.: 09/156,927

(22) Filed: Sep. 18, 1998

(30) Foreign Application Priority Data

Nov. 4, 1997 (IT) ........................................ TO97A0965

(51) Int. Cl.[7] ........................ H04Q 7/00; H04L 12/403; G06F 3/00
(52) U.S. Cl. .......................... 370/329; 370/457; 710/10
(58) Field of Search ................................. 370/252, 254, 370/328, 329, 331, 277, 310, 465, 468, 445, 457; 455/587, 589, 517, 436, 450; 379/59, 60; 710/10

(56) References Cited

U.S. PATENT DOCUMENTS 5,642,353 A * 6/1997 Roy, III et al. ............. 370/329
5,886,988 A * 3/1999 Yun et al. .................... 370/329
5,966,670 A * 10/1999 Keskitalo et al. ........... 455/562
6,108,565 A * 8/2000 Scherzer ..................... 455/562

OTHER PUBLICATIONS

"Towards a Channel Allocation Scheme for SDMA–Based Mobile Communication Systems" Notker Gerlich et al, Report No. 104,University of Wurzburg Institute of Computer Science Research Report Series, 9 pages.

* cited by examiner

Primary Examiner—Alpus H. Hsu
Assistant Examiner—Duc Ho
(74) Attorney, Agent, or Firm—Herbert Dubno

(57) ABSTRACT

In a mobile communication system with space division multiple access, under channel re-use conditions, the channel to be assigned to a terminal is determined by evaluating a cost of the assignment of each channel already in use. This cost is a function of the mean time that elapses between two successive channel assignments to the terminal, and it allows identifying the channel that allows maximising that time. The evaluation is performed by using cost coefficients that take into account information on the topology of the cell and on the mobility of the terminals and are determined in a system initialisation phase by subdividing the cell into sectors and by detecting the instants of collision between terminals.

11 Claims, 4 Drawing Sheets

METHOD FOR CHANNEL ASSIGNMENT IN A MOBILE COMMUNICATION SYSTEM WITH SPACE DIVISION MULTIPLE ACCESS

The present invention relates to mobile communication systems and more specifically it concerns a method for channel assignment in a system that exploits the space division multiple access (SDMA) technique.

Mobile communication systems are characterised by a continuous increase in the number of users, who have to share limited resources, particular in regard to the available frequency band. It is therefore of interest to study new access techniques which allow a more effective exploitation of the available resources. One of the techniques proposed for this purpose is the SDMA technique, which allows increasing system capacity by exploiting spatial separation between users. In other words, users who are sufficiently separated angularly with respect to the base radio station can share the same channel, i.e. use the same frequency and the same time slot, if FDMA-TDMA (Frequency Division Multiple Access—Time Division Multiple Access) techniques are used.

The application of this technique is made possible by the use in the base stations of adaptive array antennas (the so-called "smart antennas"), that allow distinguishing between useful signals and interfering signals and computing their directions of arrival. By following the changes in the directions of arrival both of the useful and of the interfering signals, the antennas continuously adapt the radiation diagram, thereby following the terminal of interest with the main lobe of that diagram and placing its zeroes in correspondence with the interfering terminals. This yields a better carrier/interference (C/I) ratio both for the base station and for the mobile terminals. The capability of these antennas of distinguishing between useful signals and interfering ones allows obtaining a spatial orthogonality between users, which enables to re-use the same channel for multiple users, provided they are at different angular positions with respect to the base station, i.e. provided there is an angular separation exceeding a minimum threshold between the respective radiated beams. An additional requirement is that users sharing the same channel must have similar power levels, since array antennas can attenuate the interfering signals of a terminal that uses the same channel as the terminal transmitting the useful signal only to a limited extent.

The possibility of using the same channel for multiple users clearly influences channel assignment procedures both at the call set-up and in case of handover: in SDMA systems handovers become necessary both when the angular separations of users employing the same channels decreases below the threshold (intra-cell handover) and when the C/I ratio drops below a certain value. That decrease below the threshold of the angular separation between users of the same channel shall hereafter be referred to as "collision".

The channel assignment procedure must try to meet the following requirements:
the angular separation between two terminals using the same channel shall exceed the minimum threshold;
the probability must be minimised that, for a given terminal, a new channel assignment (i.e. a handover) becomes necessary while a communication is in progress or, stated in different terms, the time between two successive channel assignments relating to the same terminal must be made as long as possible.

These requirements depend on the position of the mobile terminals, on their speed and on the topographic characteristics of the cell.

It is easy to understand that in order to meet these requirements it is convenient to assign to a terminal, whenever possible, a "regular" channel, i.e. one not shared by other terminals; only if no free regular channels exist, a shared channel, chosen with an appropriate criterion, will be assigned.

The document "Towards a Channel Allocation Scheme for SDMA-based Mobile Communication Systems", Institute of Computer Science, Universität Würzburg, Research Report Series, Report No. 104, February 1995, proposes to assign the channels by taking into account solely the position (angular separation and distance) of the terminals, and it reports some performance assessments. An assignment method of this kind entails as a consequence a non-optimal utilisation of resources, since on one hand it cannot assign the same channel to users who, although angularly close, cannot collide or will possibly collide only after a very long time due to the topographic characteristics and/or to the direction and velocity of displacement, and on the other hand it can instead cause relatively frequent handovers, if the angular separation that had induced to assign a shared channel reduces rapidly due to the topographic characteristics of the cell and/or to the users' direction and velocity of displacement.

The present invention provides instead a method of assigning channels which takes into account not only the position of the terminals, but also their characteristics of mobility as well as the topographic characteristics of the cell.

According to this method, under channel re-use conditions, the channel to be assigned to a terminal ("requesting terminal") is determined by assessing an assignment cost of each channel already in use, which cost is a function of the mean time that elapses between two successive channel assignments to said terminal, and allows identifying the channel that enables to maximise that time. This assessment is performed by using cost coefficients that take into account information on the topology of the cell and on the mobility of the terminals and that are determined in a system initialisation phase through the following operations:

subdividing a cell of the system into sectors;
tracking the active terminals during their displacement inside the cell and storing the instant at which each terminal enters each sector travelled by it in the course of that displacement;
detecting collisions between two terminals, a collision being recognised as a decrease in the angular separation between said terminals below a pre-set threshold, and the instant wherein said collision occurs;
storing, upon that detection, a collision event both for each of the sector pairs wherein two terminals involved in a collision were simultaneously present in the course of their movements within the cell, and for the individual sectors travelled by the two terminals;
counting the number of collisions for the different sector pairs and for the individual sectors;
computing the mean time elapsing between the entry of a terminal into one of the sectors considered and the instant of collision;
determining a cost coefficient for each sector pair, as a function of the mean time necessary for this collision to occur.

Preferably, such cost coefficients are inversely proportional to said mean time, which may be weighted with the probability that the collision takes place. In this second case, the operations that lead to the determination of the cost coefficients shall also comprise the computation, for each sector pair, of the probability that a collision occurs between the terminal which at the instant of the channel assignment request is in the first sector of the pair and a terminal which at the same instant is in the second sector of the pair.

The angular separation threshold can be a function of the minimum acceptable C/I ratio.

For the sake of greater clarity, reference is made to the accompanying drawings, wherein.

Figure 1:
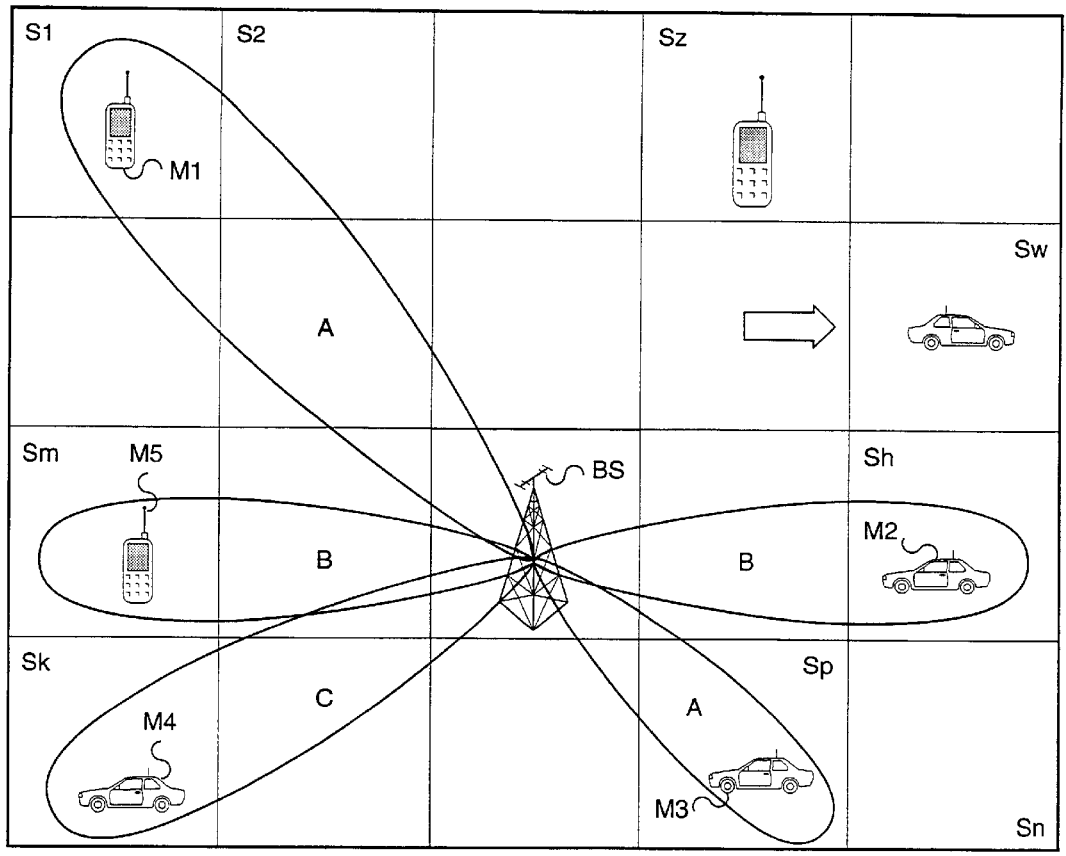
FIG. 1 is a simplified representation of a cell of a mobile communication system which utilises the SDMA technique.

With reference to FIG. 1, there has been schematically shown a cell of a mobile radio system with a certain number of active terminals (five of which, indicated as M1 . . . M5, are visible in the Figure) and a base radio station BS, here represented schematically by the antenna, which as stated above, must be able to generate beams pointing towards individual users and to follow their movements. The term "active terminal at a given instant" means a terminal which at that instant has an ongoing communication or requests access to the system. The base radio station shall in turn be connected to units of higher hierarchical level (not shown) which perform all tasks connected with managing communications, including channel assignment, as in any mobile radio system. For an understanding of the invention, the actual structure of these units need not be shown.

As the system is an SDMA system, a radio channel may be shared by multiple users provided their angular separation is such as not to give rise to superposition between the beams. By way of example in the drawing it was assumed that the terminals M1, M3 share a same channel indicated as A, that the terminals M2, M5 also share a same channel, different from the previous one (channel B) and that the user M4 is assigned a channel C, not shared by other terminals.

The general criterion for channel assignment in the system is as follows:

- if a free regular channel is available, that channel (or one of those channels, if there is more than one) is assigned to the user;
- if no free regular channels are available, then an available shared channel, chosen with the method according to the invention, is assigned to the user;
- if not even shared channels are available, then the request is rejected, i.e. the call is blocked in case of initial channel assignment or interrupted in case of handover.

The method according to the invention, which is applied in the individual cells of the system, takes into account information about the topography of the cell, the spatial distribution of the terminals at the moment of the request for a new channel and their mobility characteristics (displacements and possibly displacement velocity) and requires the assessment of a cost of channel assignment, determined as shall be seen better hereafter. The channel chosen shall in general be the one entailing the lowest cost.

Information about the topography of the cell are obtained by means of its subdivision into sectors, indicated as S1 . . . Sn in FIG. 1. The cost function shall generally be linked to the mean time necessary for a collision to occur between the terminal which has requested channel assignment and which is located in a first sector of the cell at the instant where the assignment needs to take place, and another terminal that occupies the same channel and at that instant is located in a second sector, and possibly to the probability that such collision takes place. Different ways of subdividing the cell into sectors and different expressions for the cost function are possible, as shall be more readily apparent below.

Figure 2:
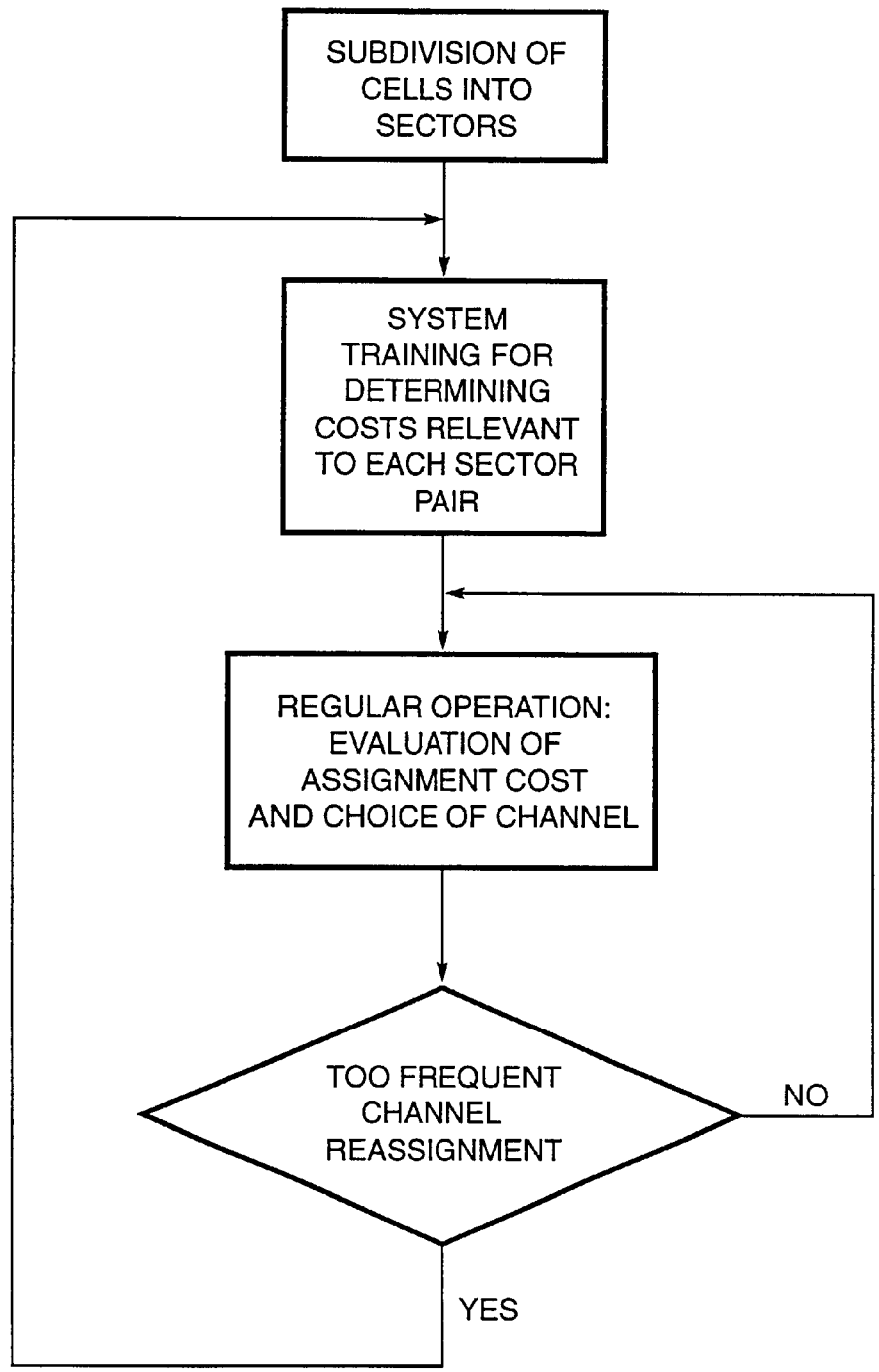
FIGS. 2, 3 are flow charts of the operations of the method according to the invention.

Application of the method thus requires three working phases, as shown in the flow chart of FIG. 2. The first one is the subdivision of the cell into sectors, which shall be performed e.g. in designing the system, when the coverage area of the cell is determined. The second one is the determination of cost values associated to the different sector pairs, and it shall be performed during a system self-learning or training phase, which can coincide for instance with a trial operation phase. These two phases shall also be indicated with the term "initialisation". The third one is the actual channel assignment during regular operation, both for setting up new connections and for intra-cell handover. On the basis of the results of the assignment, it is also possible to provide feedback on the determination of the costs associated to the sector pairs, in order to optimise system performance.

Figure 4:
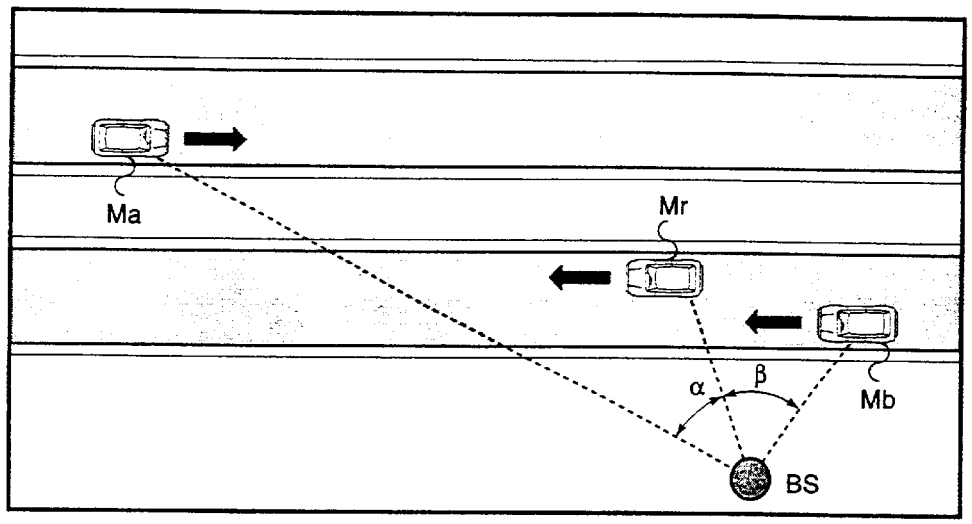
FIGS. 4 to 6 are diagrams of some channel assignment scenarios which allow understanding the advantages inherent in the use of the invention.
Figure 5:
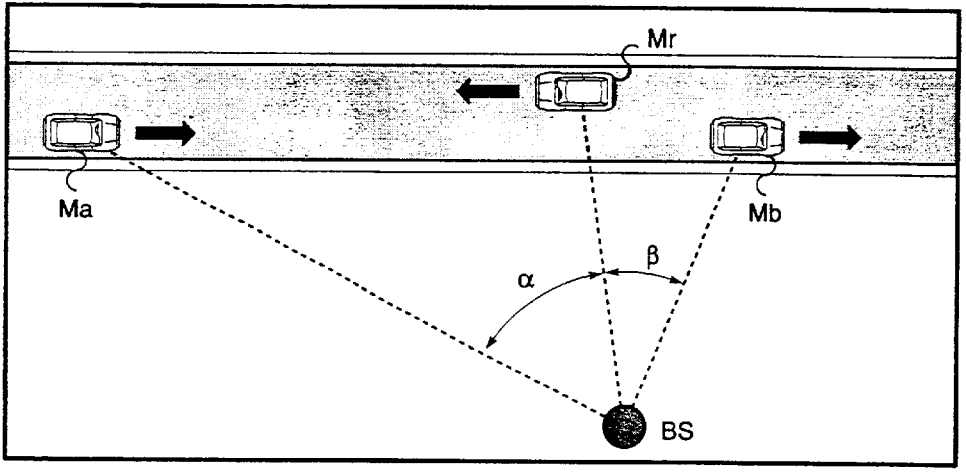
Figure 6:
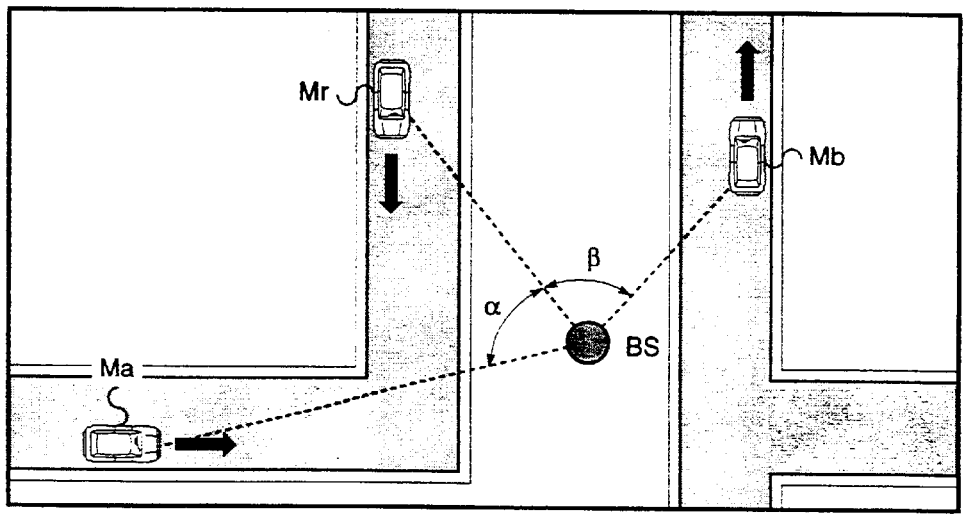

The use of information about the topography of the cell and about the mobility characteristics of the terminals actually does allow improving assignment efficiency with respect to a method that only takes into account the position of the terminals, as the analysis of FIGS. 4–6 shows.

These Figures show two active mobile terminals, indicated as Ma, Mb, respectively served by channels A and B, and a third mobile terminal Mr which is involved in a call that requires the assignment of a new channel; $\alpha$ and $\beta$ are the angular separations between Ma and Mr and respectively between Mb and Mr.

FIG. 4 allows evaluating the influence of the angular velocity of the terminals, expressed in terms of distance between the terminal and the base station. Assuming that the terminals Ma, Mb move towards Mr at the same linear velocity, angular separation $\beta$ between Mb and Mr drops below the minimum threshold $\delta$ before separation $\alpha$ between Ma and Mr, although initially $\beta$ was greater than $\alpha$: a method based on angular separation alone would not be able to predict such behaviour, thereby yielding a sub-optimal solution.

FIG. 5 allows evaluating the influence of the velocity of the terminals (in absolute value and direction): although angular separation $\alpha$ is initially greater than $\beta$, because of the direction of displacement of the terminals Ma, Mb, $\alpha$ tends to decrease and $\beta$ to increase, so the choice of channel A would lead to a smaller interval between handovers: again, the method based on angular separation alone would not be able to predict such behaviour.

Lastly, FIG. 6 allows evaluating the influence of cell topography: because of the configuration assumed for the roads and the displacements of the terminals, angular separation $\beta$ is practically not affected, whereas $\alpha$ tends to 0: if this situation were not taken into account, the channel that presents the greater initial separation (channel A) would be assigned instead of channel B.

Returning to the method according to the invention, FIG. 1 shows a subdivision into regular and essentially equal sectors Si . . . Sn. That solution can be the preferred solution when the direction of arrival of an active terminal that enters a certain sector is taken into account in determining costs, since it limits computational complexity. In other embodiments of the invention (e.g. when only the sectors travelled by two terminals that collide are considered, and not the direction of entry into them ), a subdivision that takes into greater account traffic intensity, road lay-out and cell topography may be more suitable. By way of example, in this second case one can assume a rather fine and regular subdivision in high mobility areas, taking road distribution into account in shaping the sectors; on the contrary, in areas where mobility is limited or where no users can be present, rather extensive sectors can be built. The minimum size of the sectors is linked to the accuracy with which the system is able to detect the positions of the terminals: as a quantitative indication, it can be noted that a system like GSM is able to locate the position of the user within a radius of about one hundred meters, and hence this radius may represent a minimum order of magnitude for the linear dimensions of the sectors.

The determination of cost values leads the system to build a set or matrix of coefficients Cij, one for each sector pair Si, Sj. These coefficients, in the preferred embodiment of the invention, are proportional to the inverse of the mean time Tij * that elapses between the entry of the terminal involved in channel assignment into sector Si and the collision with a terminal that at the same instant is in sector Sj. Mean time may be weighted with the probability Pij that the collision occurs. If the probability is not taken into account, then the coefficients Cij have the expression:

$$Cij=K/Tij^* \qquad (1)$$

If the probability is taken into account, then the coefficients Cij have the expression:

$$Cij=K/Tij^*Pij \qquad (2)$$

In both cases K is a proportionality constant which, for the sake of simplicity, shall hereafter be considered to be equal to 1.

Building the coefficient matrix thus requires counting events and times, and the processing units present in the fixed part of the system shall have to be programmed to perform such counts: this is absolutely not a problem, since counts of this kind are performed during the normal monitoring of the system operation. The way in which the coefficient matrices are built shall be illustrated farther on.

Figure 3:
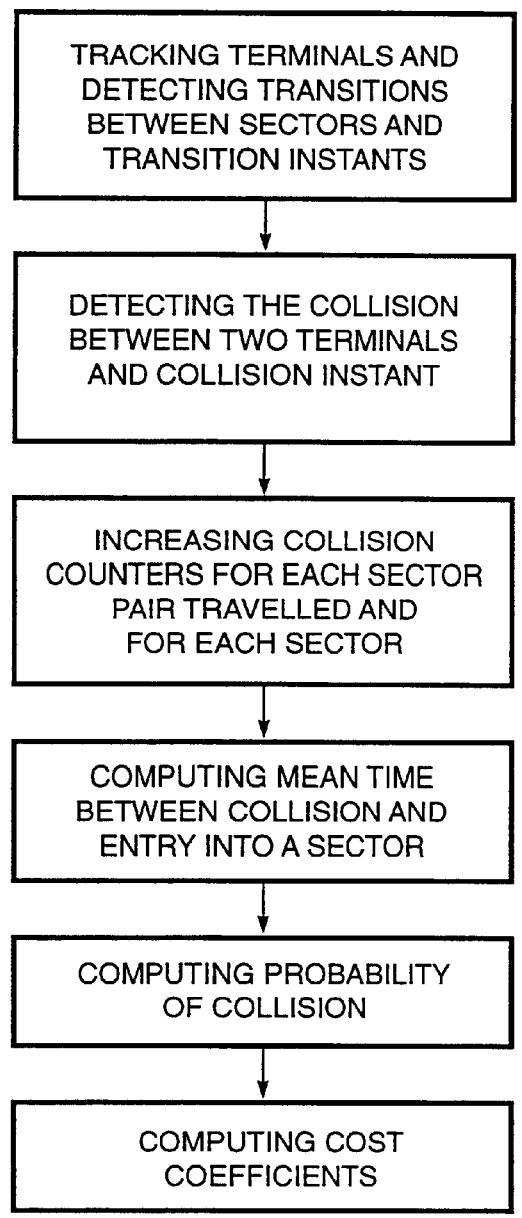

The flow chart in FIG. 3 shows the procedure that leads to the determination of the coefficients, in a first embodiment of the invention which takes into account only the sectors in which each pair of active terminals is simultaneously present and not the direction of entry into those sectors. The system constantly follows the position of the active terminals, detects the transitions between one sector and the other for each mobile means and stores the instants of transition. Upon detection of a collision event, the instant where it occurs is stored and the collision event counters are increased both for the sectors where the terminals are present at the instant of collision and for each sector pair where the two terminals were simultaneously present before colliding, as well as for the individual sectors travelled by each terminal. By using the values stored for the instants of entry into the sectors, the instant of collision and the number of collisions, the mean duration is computed of the intervals elapsed between the instant of entry into a sector and the instant of collision, always for all sectors travelled by the two terminals. Counting the collision events also allows determining the probability of collision for each pair of sectors (ratio between the number of collisions in which the pair is involved and the number of collisions in which the individual sector is involved). By using the mean times and possibly the probability of collision for each pair of sectors, costs are determined according to (1) or (2). The duration of this system training phase shall be such as to guarantee the attainment of significant values.

If the directions of entry are to be taken into account, then different counters shall be needed for each combination of directions of entry into the two sectors, and hence the mean times, the probabilities and the coefficients shall be computed separately for each combination.

Figure 7:
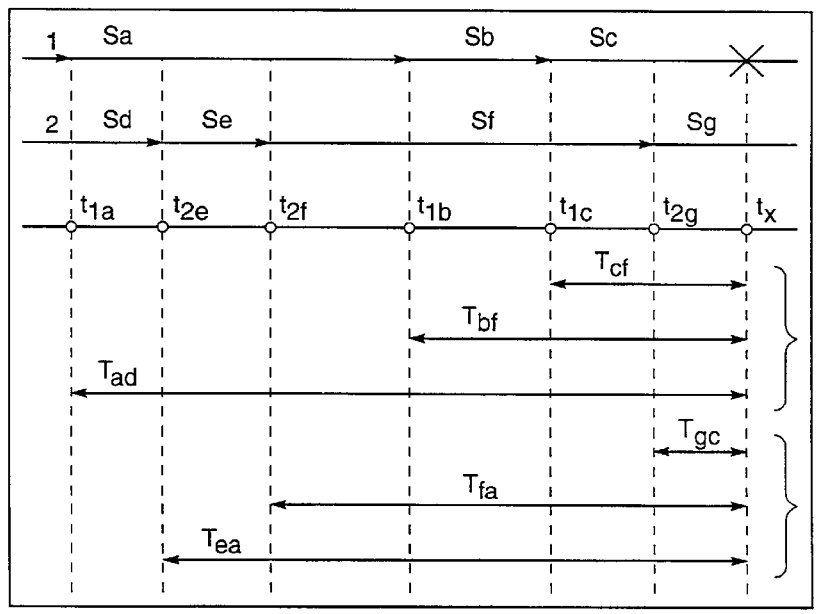
FIG. 7 is a diagram showing cost determination operations.

To provide a better illustration of the aforesaid procedure, reference is made to FIG. 7 which shows the displacements and a time diagram for two terminals of which the first enters the cell in correspondence with sector Sa and then moves into sectors Sb, Sc, whereas the other is located in sector Sd at the instant at which the first terminal enters the cell and then moves into sectors Se, Sf, Sg. It is assumed that at an instant $t_x$ at which the terminals are located inside the sectors Sc and Sg respectively, angular separation between the terminals drops below the minimum threshold δ (which may be a function of the minimum acceptable C/I ratio between the useful signal and the interfering signal of a terminal that uses the same channel), thereby giving rise to a collision. In the diagram in FIG. 7, the first two lines show the paths of the terminals, the third line shows the instants of entry of the terminals into the different sectors, and the subsequent lines show the time intervals elapsed between the entry into a sector taken into consideration and the instant of collision, for terminal 1 and for terminal 2 respectively.

For both terminals the system stores a data table containing in one row the positions of the terminal, represented by the sector identifier, and in a second row the instants of entry into the different sectors: the tables for the two terminals of the example are thus as follows:

| | Terminal 1 | | | | |
|---|---|---|---|---|---|
| position | Sa | Sb | Sc | ... | ... |
| time | $t_{1a}$ | $t_{1b}$ | $t_{1c}$ | ... | ... |
| | Terminal 2 | | | | |
| position | Sd | Se | Sf | Sg | ... |
| time | $t_{2d}$ | $t_{2e}$ | $t_{2f}$ | $t_{2g}$ | ... |

The way in which the positions of the individual terminals are evaluated depends on the specific system where the method of the invention is employed and is of no interest for the purposes of the invention. Times may be absolute times, or times relative to a reference instant.

As stated above, for the purposes of the method, the sectors involved in the collision are those where the two terminals are present simultaneously. Therefore, at the instant $t_x$ of collision, it is necessary to increase by one unit the counters Ncf, Nbf, Nad, Ncc, Nbb, Naa for terminal 1 and the analogous counters Ngc, Nga, Nea, Ngg, Nff, Nee for terminal 2. Moreover, by using the values $t_{1a}, t_{1b}, \ldots t_{2g}$ of the instant of entry of each of the two terminals into a sector, the values Tcf, Tbf, Tad of the time elapsed between the instant of collision and the entry of terminal 1 into Sc, Sb and Sa are computed, as well as respectively the values Tgc, Tfa, Tea of the time elapsed between the instant of collision and the entry of terminal 2 into Sg, Sf, Se. For each terminal, these values take into account the position of the other terminal.

Tables similar to those indicated. for terminals 1 and 2 are to be built for all pairs of active terminals followed in this training phase, and corresponding collision and time counts shall be performed for such pairs.

At the end of the training phase, the values $T_{ij}^*$ of the mean times shall be determined ($T_{ij}^* = \Sigma T_{ij}/N_{ij}$, i.e. the ratio between the sum of the times $T_{ij}$ related to the collisions that have involved the sectors $S_i$ and $S_j$ and the number of collisions $N_{ij}$) along with the probabilities of collision $P_{cg}$, $P_{cf}$, $P_{bf}$, $P_{af}$, $P_{ae}$ ($P_{ij} = N_{ij}/N_{ii}$, where $$Nii = \sum_{j=1}^{n} Nij,$$

with n=number of sectors). The probability of collision and the mean times may obviously be computed again whenever one of the counters is updated.

During regular operation, both in case of a new call set-up and in case of handover, for channel assignment to a terminal that is entering a generic sector $S_z$ the row of the coefficient matrix for that sector is read and, to determine the assignment cost, there are two possibilities of proceeding, linked respectively to the choice made for the cost coefficients.

More specifically, if the coefficients $C_{ij}$ are given by (1), for each channel the greatest one among the cost coefficients relating to the sectors wherein that channel is in use is sought; the channel assigned shall be the one for which that maximum is the lowest. If the coefficients $C_{ij}$ are given by (2), then the value $Cz^{ch} = 1/\Sigma(1/C_{zq})$ is taken as the cost $Cz^{ch}$ of the channel, where the summation concerns all the sectors $S_q$ where the channel is in use; the channel assigned shall again be the one for which $CZ^{ch}$ is the smallest. The two solutions correspond respectively to the maximisation of a minimum mean time of collision or of a mean time between successive channel assignments to the same terminal.

With reference, by way of example, to the situation in FIG. 1, it is assumed that the channels available are the three channels A, B, C, in use respectively for the sectors S1, Sp; Sh, Sm; Sk. The line Sz of the coefficient matrix is then read, and the costs relating to the sectors wherein the channels A, B, C are in use are read. The values of interest in the line are as follows:

|    | S1  |     | Sh  |     | Sk  |     | Sm  |     | Sp  |
|----|-----|-----|-----|-----|-----|-----|-----|-----|-----|
| Sz | Cz1 | ... | Czh | ... | Czk | ... | Czm | ... | Czp |

If the first method is used, then the costs shall be: for channel A, C(A)=Max (Cz1, Czp); for channel B, C(A)= Max(Czh, Czm); for channel C, C(C)=Czk. With the second method, for channel A the cost shall be $$C(A) = \frac{1}{\frac{1}{Cz1} + \frac{1}{Czp}},$$

for channel B it shall be $$C(B) = \frac{1}{\frac{1}{Czh} + \frac{1}{Czm}};$$

for channel C, used only in Sk, the cost shall be C(C)=Czk. The channel assigned shall be the one for which the value C(i) (i=A, B, C) is the smallest.

If the direction according to which a terminal enters a sector is taken into account in determining costs, then the method requires building a matrix of cost coefficients for each of the possible combinations of access directions into a sector pair. The coefficients may again be given by (1) or by (2). Still referring to the square sectors shown in FIG. 1 and assuming for the sake of simplicity that the terminals enter the sectors only from the sides, the mean times between the entry into a sector and the instant of collision and the cost coefficients for each pair $S_i$, $S_j$ of sectors shall in general be of the type $T_{ij}^{d_id_j}$ and respectively $C_{ij}^{d_id_j}$ where $d_i$, $d_j$ are one of the four possible directions of entry into $S_i$ and $S_j$ (hereafter indicated as a=entry from above, b=entry from below, d=entry from the right, s=entry from the left). Thus, there shall be 16 matrices instead of a single one. In this case it shall also be necessary to distinguish the case of handover from that of call set-up. In the first case, the direction wherein a terminal enters the sector is known, and therefore channel assignment is performed exactly as in the previous case, by reading the coefficients in the matrix corresponding to the specific pair of directions of entry and proceeding as required by either type of coefficient. In the second case, the direction of arrival of the requesting terminal is unknown, and the evaluation of the assignment cost is a bit more complex, though it does follow the principles described above.

More specifically, considering solely the requesting terminal located in the sector $S_z$ and another active terminal that occupies the sector $S_w$ and that has entered that sector from the left (as shown by the arrow), when the coefficients are given by (1), the greatest of the four coefficients $C_{zw}^{as}$, $C_{zw}^{bs}$, $C_{zw}^{ds}$, $C_{zw}^{ss}$ is taken as the channel assignment cost. If the coefficients are given by (2), then the mean collision time $T_{zw}^{?s}$ shall be computed as $T_{zw}^{?s} = \Sigma(p_{xs}T_{xs}/\Sigma p_{xs})$ where x=a, b, d, s: by setting $p_{?s} = \Sigma p_{xs}/4$, with simple mathematical considerations one can see that the assignment cost is given by $C_{zw}^{?s} = 4/(\Sigma 1/C_{zw}^{xs})$.

The above considerations can be generalised immediately to the case wherein each channel is engaged by multiple terminals.

It is clear that, if the direction of entry is taken into account, it is convenient to choose a subdivision into sectors of regular geometric shape (commonly quadrangular or hexagonal) in order to limit the number of possible directions of entry into the sectors and thus the number of matrices to be created.

In the case of a regular subdivision, a mean velocity of the terminals can also be taken into account, which mean velocity is expressed for instance as the number of sectors travelled by the terminal in the unit of time. In this case, one could think of grouping the mobile terminals into velocity classes, and the coefficient matrices shall then be built for each pair of classes (in the most general case, the two terminals that collide shall belong to different velocity classes). The intervals $T_{ij}$ indicated above can be used as times. It is intuitive that to higher speeds correspond higher costs.

It is evident that the description above is provided purely by way of non limiting example and that variations and modifications are possible without thereby departing from the scope of the invention.

What is claimed is:

1. A method of assigning radio channels in a mobile communication system with space division multiple access, wherein multiple terminals active in a same cell of the system can utilize a same channel if angular separation of the terminals does not drop below a preset threshold and wherein at least under conditions of re-use of the channels, a channel to be assigned to a terminal is determined by evaluating a cost of an assignment for each available channel, which cost is linked to a time that elapses between two successive channel assignments to said terminal, and by identifying the channel that allows maximizing of said time, said evaluation being performed by utilizing cost coefficients which take into account information about a topology of the cell and about a mobility of the terminals and which are determined in the course of a system initialization phase which comprises the steps of:

subdividing a cell of the system into sectors;

tracking active terminals during movements of the active terminals within the cell and storing an instant of entry of each terminal into each sector travelled by the terminal in the course of its movement;

detecting collisions between two terminals, a collision being recognized as a drop in the angular separation between said terminals below the threshold, and detecting an instant wherein said collision occurs;

storing, upon said detection, a collision event both for each of the sector pairs where two terminals involved in a collision were simultaneously present during movements of the two terminals within the cell, and for the individual sectors travelled by the two terminals;

counting the nether of collisions for different sector pairs and for the individual sectors;

computing a mean time elapsing between the entry of a terminal into one of the sectors considered and the instant of collision; and determining a cost coefficient for each sector pair, which coefficient is a function of the mean time necessary for the collision to take place.

2. The method as claimed in claim 1 wherein the cost coefficients determined during the initialization phase are periodically updated according to results of the channel assignment.

3. The method as claimed in claim 1 wherein said steps of counting the number of collisions, computing the mean time and determining a cost coefficient for each sector pair are performed separately for each possible combination of directions of entry of the terminals into the two sectors.

4. The method according to claim 3 wherein starting from said mean time, a mean velocity of each active terminal is determined; the mean velocities are grouped into velocity classes, each comprising velocity values within a predetermined interval; and said steps of counting the number of collisions, computing the mean time and determining a cost coefficient for a sector pair are performed separately for each pair of velocity classes.

5. The method as claimed in claim 4 wherein said mean velocity is determined as the ratio between the number of sectors travelled during said mean time and the mean time.

6. The method as claimed in claim 5 wherein said cost coefficients are proportional to the inverse of said mean time.

7. The method as claimed in claim 6 wherein the evaluation of the cost of the assignment, for each usable channel the maximum value is sought among the cost coefficients related to each of the sector pairs comprising the sector where the requesting terminal is located and one of the sectors where terminals that utilize the channel are located, and wherein the channel for which such maximum value is the lowest is assigned.

8. The method as claimed in claim 6 wherein the evaluation of the cost of assignment to a requesting terminal that is located in a first sector;

a) in case of new cell set-up, for each usable channel the maximum value is sought among the cost coefficients that, for each of the sector pairs comprising the first sector and a second sector wherein a second terminal which utilizes the channel is located, relate to the combination of one of the possible directions of entry of the requesting terminal into the first sector with the direction of entry of the second terminal into the respective second sector; and b) in case of handover, for each usable channel the maximum value is sought among the cost coefficients that, for each of the sector pairs comprising the first sector and a second sector wherein a second terminal which utilizes the channel is located, relate to the specific combination of directions of entry of the requesting terminal and of the second terminal into the respective sectors, the channel for which said maximum value is the lowest being assigned.

9. The method as claimed in claim 1 wherein during said initialization phase, for each sector pair, a probability is also computed of a collision between a requesting terminal located in a first sector of the pair and another terminal which at the instant at which the need to assign the channel arises is located in the second sector of the pair, and said cost coefficients are proportional to the inverse of the mean time weighted with the probability of collision.

10. The method as claimed in claim 9 wherein the evaluation of the assignment cost, for each usable channel the sum is computed of the inverses of the cost coefficients relating to each of the sector pairs comprising the sector wherein the requesting terminal is located and one of the sectors wherein terminals which utilize said channel are located, and in that the channel for which the inverse of that sum is minimum is assigned.

11. The method as claimed in claim 9 wherein the evaluation of the cost of assignment to a requesting terminal that is located in a first sector;

a) in case of new call set-up, for each usable channel and for each of the sector pairs comprising the first sector and a sector wherein a second terminal that uses the channel is located, a mean probability of collision (P?s) is determined as the average of the probabilities of collision for each combination of one of the possible directions of entry of the requesting terminal into the first sector with the direction of entry of the second terminal into the respective second sector, and a weighted mean time $T_{ij}^{?s}$ is determined as the same of the mean times relating to each of said combinations and weighted each with the respective probability of collision normalized with respect to the total probability of collision between the requesting terminal and a second terminal that entered the respective second sector from the specific direction; a mean cost coefficient is determined which is proportional to the inverse of the product between the weighted mean time and the mean probability; and the sum of the inverses of the mean cost coefficients is computed;

b) in case of handover, for each usable channel, the sum is computed of the inverses of the cost coefficients relating to each of the sector pairs comprising the sector wherein the requesting terminal is located and one of the sectors wherein terminals that use said channel are located, for the specific combination of directions of entry into the sectors; and wherein the channel for which the inverse of such sum is the lowest is assigned.

* * * * *